(12) United States Patent
Kim et al.

(10) Patent No.: US 8,249,235 B2
(45) Date of Patent: Aug. 21, 2012

(54) CONFERENCE CALL PRIORITIZATION

(75) Inventors: Moon J. Kim, Wappingers Falls, NY (US); Reto M. Sigl, Zurich (CH); Eric T. C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 1135 days.

(21) Appl. No.: 11/847,564

(22) Filed: Aug. 30, 2007

(65) Prior Publication Data

US 2009/0060157 A1 Mar. 5, 2009

(51) Int. Cl.
*H04M 3/42* (2006.01)

(52) U.S. Cl. .................. 379/202.01; 370/261; 709/204; 709/227

(58) Field of Classification Search ............ 379/202.01; 370/261; 348/14.08, 14.09; 709/204, 227
See application file for complete search history.

(56) References Cited

U.S. PATENT DOCUMENTS

| | | | |
|---|---|---|---|
| 5,440,624 A * | 8/1995 | Schoof, II | 379/202.01 |
| 5,594,948 A | 1/1997 | Talarmo et al. | |
| 6,128,649 A * | 10/2000 | Smith et al. | 709/217 |
| 7,016,315 B2 * | 3/2006 | Armbruster et al. | 370/260 |
| 2004/0028199 A1 | 2/2004 | Carlson | |
| 2004/0052218 A1 * | 3/2004 | Knappe | 370/260 |
| 2006/0098798 A1 | 5/2006 | Krasnansky | |

* cited by examiner

*Primary Examiner* — Quynh Nguyen
(74) *Attorney, Agent, or Firm* — Hoffman Warnick LLC; William Schiesser

(57) ABSTRACT

An improved solution for prioritizing conference call participants is provided. In an embodiment of the invention, a method includes detecting a sound of a first conference call participant; disabling a distribution of a sound of a second conference call participant upon the detecting; and enabling the distribution of the sound of the second conference call participant after an expiration of a time period. In an embodiment, a higher priority may be assigned to a specific participant, such as the host, an administrator, or manager.

22 Claims, 3 Drawing Sheets

CONFERENCE CALL PRIORITIZATION

FIELD OF THE INVENTION

Aspects of the invention relate generally to conference call systems, and more particularly, to conference call prioritization.

BACKGROUND OF THE INVENTION

With the advent of conference call systems, whether it is via analog signal (e.g., telephone circuit) or via digital signal (e.g., Voice over Internet Protocol (VoIP)) technologies, has come advantages and conveniences to the conference call participants, most notably in the business world.

There are disadvantages with meetings held via a conference call system. For example, unlike with a live, in-person conference or meeting, the nuance of body language, facial expressions, hand signals, and the like, cannot typically be conveyed to others. With any conference or meeting, more than one participant will attempt to communicate at, or near, the same time. This lends to confusion and diminishes the quality of the meeting as various participants will concurrently talk and/or talk "over each other". This is further compounded as the number of participants increase. Compounding the shortcomings of a conference call are that the various forms of non-verbal communication are not present to aid in keeping order, sequence, and control to the various participants talking. This is even exacerbated with a VoIP conference call. With conference call systems there is no efficient control mechanism to address these various issues.

In view of the foregoing, a need exists to overcome one or more of the deficiencies in the related art.

BRIEF SUMMARY OF THE INVENTION

Aspects of the invention provide an improved solution for prioritizing conference call participants. In an embodiment of the invention, a method includes detecting a sound of a first conference call participant; disabling a distribution of a sound of a second conference call participant upon the detecting; and enabling the distribution of the sound of the second conference call participant after an expiration of a time period. In an embodiment, a higher priority may be assigned to a specific participant, such as the host, an administrator, or manager.

A first aspect of the invention provides a method of prioritizing conference call participants, the method comprising: detecting a sound of a first conference call participant; disabling a distribution of a sound of a second conference call participant upon the detecting; and enabling the distribution of the sound of the second conference call participant after an expiration of a time period.

A second aspect of the invention provides a system for prioritizing conference call participants, the system comprising: a detection system for detecting a sound of a first conference call participant; a system for disabling a distribution of a sound of a second conference call participant upon a detection; and a system for enabling the distribution of the sound of the second conference call participant after an expiration of a time period.

A third aspect of the invention provides a computer program comprising program code stored on a computer-readable medium, which when executed, enables a computer system to implement a method of prioritizing conference call participants, the method comprising: detect a sound of a first conference call participant; disable a distribution of a sound of a second conference call participant upon the detection; and enable the distribution of the sound of the second conference call participant after an expiration of a time period.

A fourth aspect of the invention provides a method of deploying a system for prioritizing conference call participants, the method comprising: providing a computer system operable to: detect a sound of a first conference call participant; disable a distribution of a sound of a second conference call participant upon the detection; and enable the distribution of the sound of the second conference call participant after an expiration of a time period.

A fifth aspect of the invention provides a data processing system for prioritizing conference call participants, comprising: a processing unit; a bus coupled to the processing unit; and a memory medium coupled to the bus comprising program code, which when executed by the processing unit causes the data processing system to: detect a sound of a first conference call participant; disable a distribution of a sound of a second conference call participant upon the detection; and enable the distribution of the sound of the second conference call participant after an expiration of a time period.

A sixth aspect of the invention provides computer software embodied in at least one propagated signal for prioritizing conference call participants, the at least one propagated signal comprising instructions for causing at least computer system to: detect a sound of a first conference call participant; disable a distribution of a sound of a second conference call participant upon the detection; and enable the distribution of the sound of the second conference call participant after an expiration of a time period.

A seventh aspect of the invention provides a business method for prioritizing conference call participants, the business method comprising: managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for prioritizing conference call participants. In an embodiment of the invention, a method includes detecting a sound of a first conference call participant; disabling a distribution of a sound of a second conference call participant upon the detecting; and enabling the distribution of the sound of the second conference call participant after an expiration of a time period. In an embodiment, a higher priority may be assigned to a specific participant, such as the host, an administrator, or manager. As used herein, unless otherwise noted, the term "set" means one or more (i.e., at least one); and, the phrase "any solution" means any now known or later developed solution.

Figure 1:
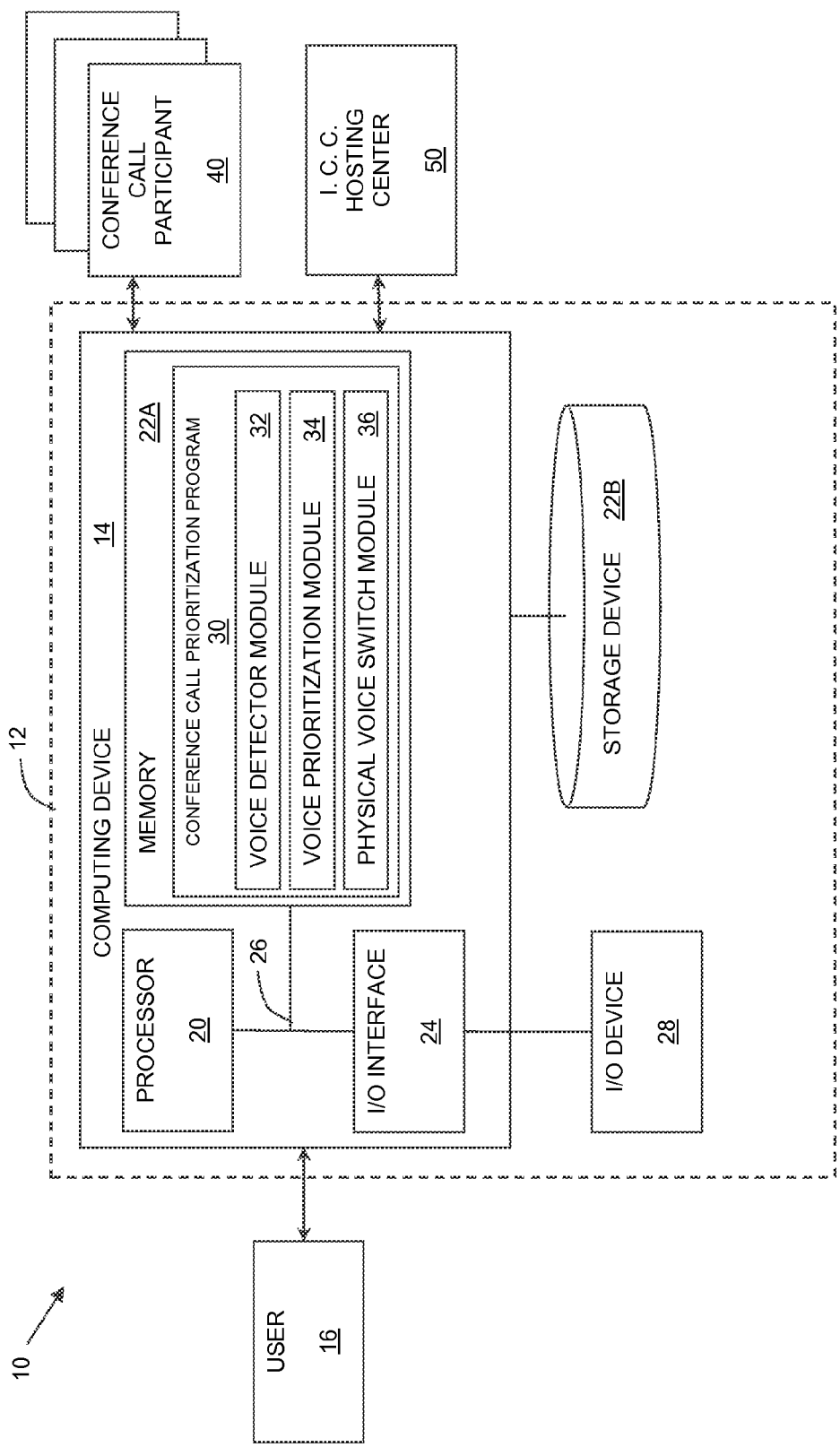
FIG. 1 shows an illustrative environment for applying a conference call prioritization method according to an embodiment of the invention.

Turning to the drawings, FIG. 1 shows an illustrative environment 10 for prioritizing conference call participants 40 according to an embodiment of the invention. To this extent, environment 10 includes a computer system 12 that can perform the process described herein in order to prioritize conference call participants 40. In particular, computer system 12 is shown including a computing device 14 that comprises a conference call prioritization program 30, which makes computing device 14 operable for prioritizing conference call participants 40, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as conference call prioritization program 30, which is stored in a storage system, such as memory 22A and/or storage device 22B. While executing program code, processor 20 can read and/or write data to/from memory 22A, storage device 22B, and/or I/O interface 24. Bus 26 provides a communications link between each of the components in computing device 14. I/O device 28 can comprise any device that transfers information between a user 16 and computing device 14. To this extent, I/O device 28 can comprise a user I/O device to enable an individual user 16 to interact with computing device 14 and/or a communications device to enable a system user to communicate with computing device 14 using any type of communications link.

In any event, computing device 14 can comprise any general purpose computing article of manufacture capable of executing program code installed thereon. However, it is understood that computing device 14 and conference call prioritization program 30 are only representative of various possible equivalent computing devices that may perform the process described herein. To this extent, in other embodiments, the functionality provided by computing device 14 and conference call prioritization program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, conference call prioritization program 30 enables computer system 12 to prioritize conference call participants 40. To this extent, conference call prioritization program 30 is shown including a voice detector module 32, a voice prioritization module 34, and a physical voice switch module 36. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Conference call participant 40 may be any quantity (e.g., 1, 2, ... N) of entities (e.g., person, machine generated voice, etc.) who are connected together, via any suitable conference calling system, so as to conduct a conference call. The participants 40 may be using any type of communication system, such as a system that utilizes digital signals (e.g., Voice over Internet Protocol (VoIP) system), or a system that utilizes analog system (e.g., a traditional telephone circuit system), and/or the like. One embodiment of a conference calling system is an Intelligent Conference Call Hosting Center (I.C.C. Hosting Center) 50 as discussed herein. The I.C.C. Hosting Center 50 may include various modules including a Call Schedule and Event Manager; an Intelligent Call Forwarder/Router; a Bandwidth and Network Optimizer/Load Balancing; Administration; a User Profile Database, and/or the like.

Figure 2:
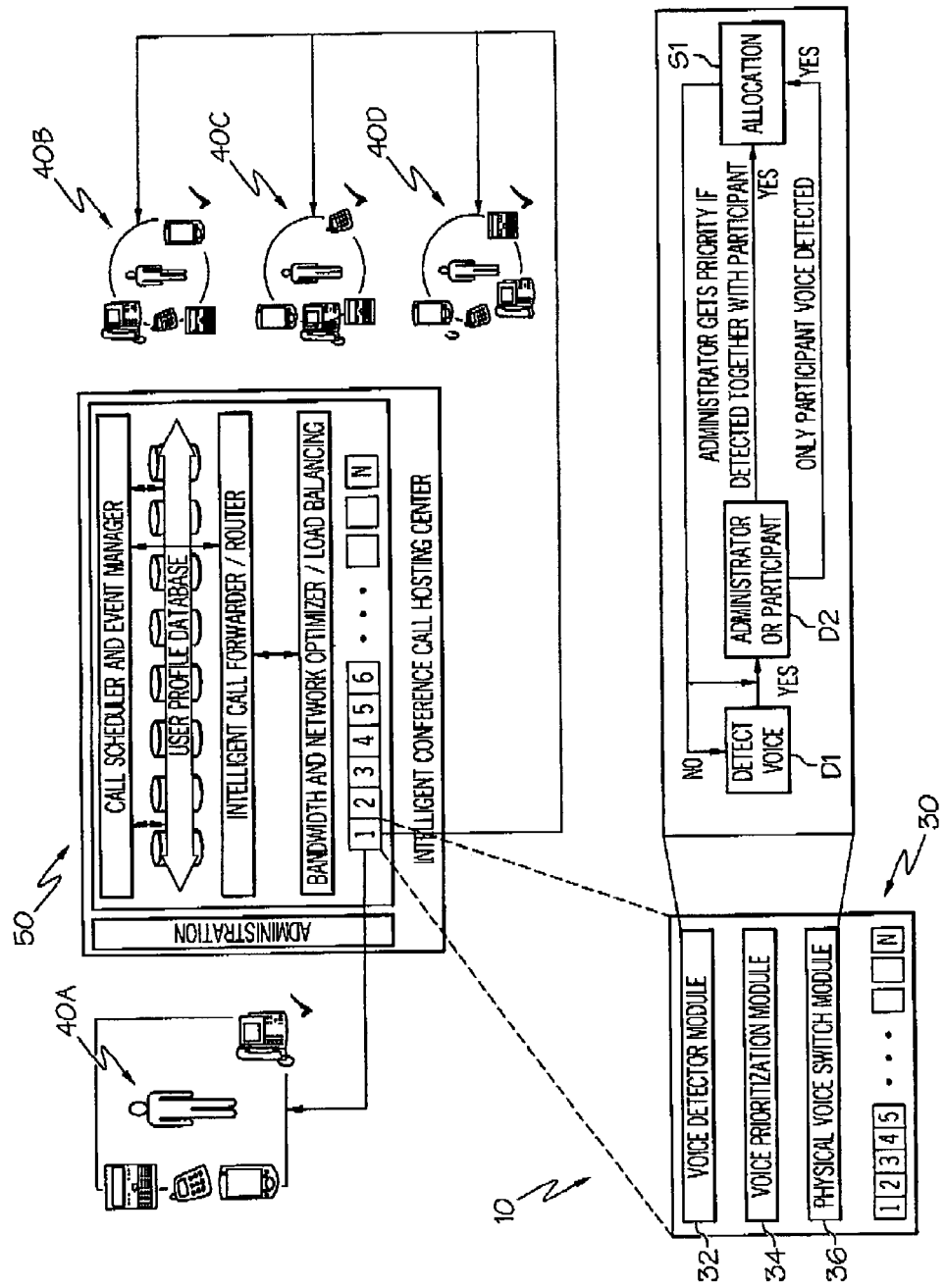
FIG. 2 shows an illustrative diagram of an application of the system in FIG. 1 being applied to a conference call according to an embodiment of the invention.
Figure 3:
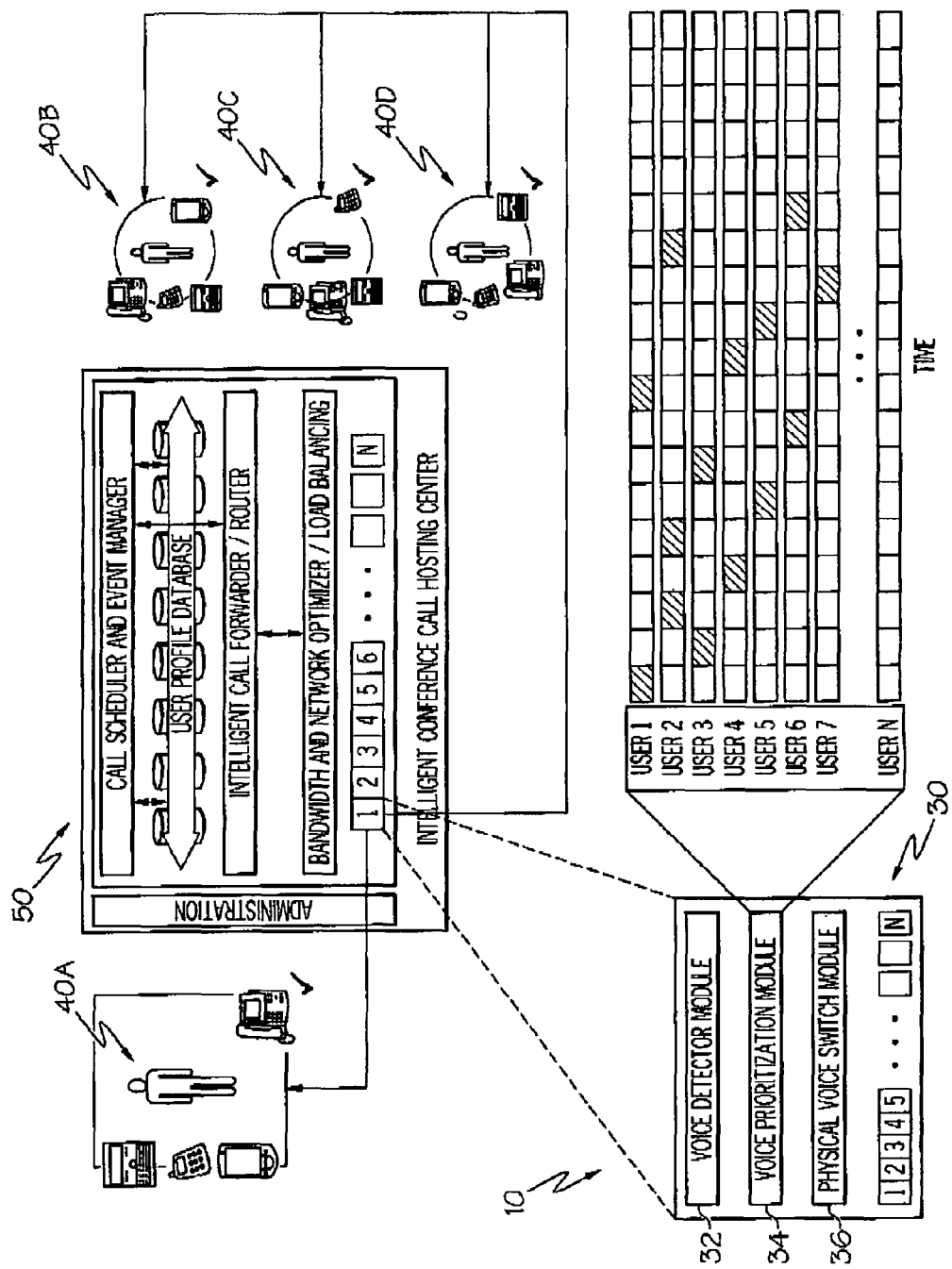
FIG. 3 shows another illustrative diagram of an application of the system in FIG. 1 according to another embodiment of the invention.

Aspects of the invention provide an improved solution for prioritizing conference call participants 40. To this extent, FIGS. 2 and 3 show illustrative diagrams of an application of the system 10 in FIG. 1 during a conference call session, according to embodiments of the invention. Two or more entities may wish to communicate via a conference call. For example, a plurality of conference call participants 40 are arranged to conduct a conference call via the I.C.C. Hosting Center 50. In an embodiment the various conference call participants ("participants") 40 may provide their profile phone numbers so that the I.C.C. Hosting Center 50 can contact the participants 40 for the conference call. This information may be stored in a user provide database found in the I.C.C. Hosting Center 50. For example, the phone numbers may be for a range of cellular phone, Local Area Network (LAN) line, Voice over Internet Protocol (VoIP) soft/physical phones, and/or the like. The I.C.C. Hosting Center 50 will automatically initiate calls to all participants 40 (e.g., 40A, 40B, 40C, 40D) and bring them together to a conference call session where the conference call can begin.

For example, as shown in FIG. 2, one participant 40A may act as the conference call administrator, moderator, host, and/or initiator and thereby typically initiates a conference call invitation to all the other participants (e.g., 40B, 40C, 40D). In any event, the other participants 40B, 40C, 40D are notified and accept the conference call invitation from the moderator 40A.

In any event, a conference call invite application may then synchronize the participants 40 that are going to be attending the conference call, based on their acceptance with the Call Scheduler and Event Manager located within the I.C.C. Host Center 50. The Call Scheduler and Event Manager then may query the User Profile Database, in the I.C.C. Host Center 50, to retrieve all accepted participant's 40 personal profile with their list of phone numbers that they can reached at. The Call Scheduler and Event Manager then creates a trigger event for the exact appointment time for the conference call scheduled, thereby enabling the Call Scheduler and Event Manager to invoke the Intelligent Call Forwarder/Router, in the I.C.C. Host Center 50, to contact the various participants 40 who had accepted the conference call invite and then be able to forward all participant's 40 session to the one that was originally initiated by the moderator 40A.

The Intelligent Call Forwarder/Router, in the I.C.C. Host Center 50, may then contact the accepted attendees 40B, 40C, 40D and the moderator 40A through the available contact methods listed in their respective profile. As FIG. 2 shows, different participants 40 may be contacted for the conference call via different methodologies. For example, the moderator 40A is contacted through a LAN line. Conversely, a second participant 40B is contacted through a smart device (e.g., a personal digital assistant (PDA)); a third participant 40C is contacted through a cell phone; and, a fourth participant 40D is contacted through a VoIP application. In any event, the Intelligent Call Forwarder/Router gathers all participants 40A-40D that have been initiated and contacted, thereby bringing them to a session where their conference call can begin.

A conference call session (e.g., conference call session 1) thus begins. The voice detector module 32 of the system 10 detects a sound (e.g., voice) of a first conference call participant 40, as shown by D1. In this manner, the voice detector module 32 detects voices on a first come, first serve basis. An output of the voice detector module 32 will notify the voice prioritization module 34 as to which participant 40 spoke first in the conference call and thereby allow the detected ("first") participant 40 to continue speaking during the conference call session. As such the system 10 will disable the distribution of any sounds (e.g., voices) from all the other conference call participants 40 upon the detecting of the "first" participant 40. For example, the other participants' 40 lines can be muted and thereby prevented from being distributed.

In any event, at D1, the voice detector module 32 will continue to query so as to detect that the allowed call, or "first", participant 40 is still speaking by detecting that his/her voice is still being sampled. If the first participant's 40 voice is no longer detected, the system 10 will then continue detecting which sound (e.g., voice) gets sampled first and repeat the entire process until the conference call has ended.

As FIG. 3 shows, upon the detecting of the sound of the particular participant 40, a time period may be allocated, denoted as S1 in FIG. 2, by the system 10 for how long a time period can expire, typically after a period of silence during the conference call, at which the system 10 enables all the other participants 40 to speak (e.g., unmute their lines). The muting and/or unmuting of lines may be done by the physical voice switch module 36. The time period may be fixed, adjustable, preset, and/or predetermined. For example, the time period may be set at 1.5 seconds. That is upon the detection of silence of 1.5 seconds (or more), the system 10 will enable all participants 40 to speak. In this manner, only one participant 40 can speak (i.e., be heard by other participants 40) at a time during the conference call. For example, the shaded boxes extending along a time-axis in FIG. 3 from the voice prioritization module 34 represent that no two participants 40 may speak concurrently.

While shown and described herein as a method and system for prioritizing conference call participants 40, it is understood that the invention further provides various alternative embodiments. For example, in one embodiment, aspects of the invention may include that a moderator 40A may automatically get top priority for detection and/or disabling as compared to all the other participants 40B, 40C, 40D. For example, as shown in FIG. 3, a physical voice line for a participant 40A (e.g., moderator, host, administrator, initiator, etc.) is always reserved for the moderator 40A. This override and/or priority capability, typically provided by the voice prioritization module 34, may be automatic and permanent, or it may be adjustable. For example, the moderator 40A may be able to turn the override capability off and/or on. Similarly, the moderator 40A may be able to appoint this override capability to one, or more, other participants 40. In another embodiment, participants 40 other than the moderator 40A may have the override capability. For example, a supervisor may be designated as having the particular override capability. In any event, after detecting a sound (e.g., voice) of one, or more, conference call participants 40, the method may include then determining, at D2 (FIG. 2), whether one of the detected sound(s) is that of a "special" participant 40 (i.e., one, or more, participants 40 that have override capability). If D2 is "yes" (i.e., at least one sound is from "special" participant 40), then the system 10 will disable the distribution of all other participants 40, including, potentially, other detected participants 40. In this manner, any special participants 40 (e.g., administrator) may override and/or get priority over the other participants 40 from speaking during the conference call session.

In another embodiment, the invention provides a computer program stored on a computer-readable medium, which when executed, enables a computer system to prioritize conference call participants 40. To this extent, the computer-readable medium includes program code, such as conference call prioritization program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of deploying a system for prioritizing conference call participants 40. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that prioritizes conference call participants 40, which enables users to perform the process described herein on a subscription, advertising, and/or fee basis. That is, a service provider could offer to manage a network and/or a computer system 12 (FIG. 1) that allows users to prioritize conference call participants 40 as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of prioritizing conference call participants, the method comprising:
    automatically initiating contact with each of the conference call participants, the conference call participants having previously accepted an invitation to participate in a conference call at a previously scheduled time, wherein at least one of the conference call participants is contacted using a different methodology from that of a second one of the conference call participants;
    detecting, with a computer device, a sound of a first conference call participant that originates from the first conference call participant;
    disabling, with the computer device, a distribution of a sound of a second conference call participant upon the detecting;
    enabling the distribution of the sound of the second conference call participant after an expiration of a time period; and
    appointing a priority to the first conference call participant that is different than a priority of the second conference call participant, wherein the priority determines a hierarchy of the detecting.

2. The method of claim 1, further comprising distributing the sound of the first conference call participant.

3. The method of claim 1, wherein the sound comprises an initiation of a communication by the first call participant with the conference call participants, and wherein the time period includes a period of silence subsequent to the detecting that signifies an end of the communication.

4. The method of claim 1, wherein the time period is one of: adjustable, preset or predetermined.

5. The method of claim 1, wherein the conference call participants use one of: a Voice over Internet Protocol (VoIP) system or a telephone circuit system.

6. The method of claim 1, wherein the disabling comprises muting a line of the second conference call participant.

7. The method of claim 1, wherein the second conference call participant includes a plurality of conference call participants.

8. The method of claim 1, wherein the first conference call participant is one of: a moderator, an administrator, a host, or a supervisor.

9. The method of claim 1, wherein the sound includes a voice.

10. A system for prioritizing conference call participants, the system comprising:
    a system for automatically initiating contact with each of the conference call participants, the conference call participants having previously accepted an invitation to participate in a conference call at a previously scheduled time, wherein at least one of the conference call participants is contacted using a different methodology from that of a second one of the conference call participants;
    a system for detecting a sound of a first conference call participant that originates from the first conference call participant;
    a system for disabling a distribution of a sound of a second conference call participant upon a detection;
    a system for enabling the distribution of the sound of the second conference call participant after an expiration of a time period; and
    a system for appointing a priority to the first conference call participant that is different than a priority of the second conference call participant, wherein the priority determines a hierarchy of the detecting.

11. The system of claim 10, further comprising a system for distributing the sound of the first conference call participant.

12. The system of claim 10, wherein the sound comprises an initiation of a communication by the first call participant with the conference call participants, and wherein the time period includes a period of silence subsequent to the detecting that signifies an end of the communication.

13. The system of claim 10, wherein the time period is one of: adjustable, preset or predetermined.

14. The system of claim 10, wherein the conference call participants use one of: a Voice over Internet Protocol (VoIP) system or a telephone circuit system.

15. The system of claim 10, wherein the disabling system mutes a line of the second conference call participant.

16. The system of claim 10, wherein the second conference call participant includes a plurality of conference call participants.

17. The system of claim 10, wherein the first conference call participant is one of: a moderator, an administrator, a host, or a supervisor.

18. The system of claim 10, wherein the sound includes a voice.

19. A non-transitory computer-readable storage device having a stored computer program code which when executed, enables a computer system to implement a method of prioritizing conference call participants, the method comprising:
    automatically initiate contact with each of the conference call participants, the conference call participants having previously accepted an invitation to participate in a conference call at a previously scheduled time, wherein at least one of the conference call participants is contacted using a different methodology from that of a second one of the conference call participants;
    detect a sound of a first conference call participant that originates from a first conference call participant;
    disable a distribution of a sound of a second conference call participant upon detection;
    enable the distribution of the sound of the second conference call participant after an expiration of a time period; and appoint a priority to the first conference call participant that is different than a priority of the second conference call participant, wherein the priority determines a hierarchy of the detecting.

20. The computer program of claim 19, the method further comprising distribute the sound of the first conference call participant.

21. A method of deploying a system for prioritizing conference call participants, the method comprising:

provide a computer system operable to:

automatically initiate contact with each of the conference call participants, the conference call participants having previously accepted an invitation to participate in a conference call at a previously scheduled time, wherein at least one of the conference call participants is contacted using a different methodology from that of a second one of the conference call participants;

detect a sound of a first conference call participant that originates from a first conference call participant;

disable a distribution of a sound of a second conference call participant upon the detection;

enable the distribution of the sound of the second conference call participant after an expiration of a time period; and appoint a priority to the first conference call participant that is different than a priority of the second conference call participant, wherein the priority determines a hierarchy of the detecting.

22. A business method for prioritizing conference call participants, the business method comprising:

managing a network that includes at least one computer system operable to:

automatically initiate contact with each of the conference call participants, the conference call participants having previously accepted an invitation to participate in a conference call at a previously scheduled time, wherein at least one of the conference call participants is contacted using a different methodology from that of a second one of the conference call participants;

detect a sound of a first conference call participant that originates from a first conference call participant;

disable a distribution of a sound of a second conference call participant upon the detection;

enable the distribution of the sound of the second conference call participant after an expiration of a time period;

appoint a priority to the first conference call participant that is different than a priority of the second conference call participant, wherein the priority determines a hierarchy of the detecting; and receiving payment based on the managing.

* * * * *